Oct. 18, 1955          L. A. WENDEL          2,721,279
ELECTRIC MOTORS WITH CLUTCH-BRAKE DEVICES
Filed Feb. 14, 1951          2 Sheets-Sheet 1

Inventor
Lorenz A. Wendel

Witness=
William Martins

By William P. Stewart
Attorney

Oct. 18, 1955  L. A. WENDEL  2,721,279
ELECTRIC MOTORS WITH CLUTCH-BRAKE DEVICES
Filed Feb. 14, 1951  2 Sheets-Sheet 2

Inventor
Lorenz A. Wendel

Witness:
William Martins

By William P. Stewart
Attorney

United States Patent Office 2,721,279
Patented Oct. 18, 1955

2,721,279

ELECTRIC MOTORS WITH CLUTCH-BRAKE DEVICES

Lorenz A. Wendel, Somerville, N. J., assignor to The Singer Manufacturing Company, Elizabeth, N. J., a corporation of New Jersey Application February 14, 1951, Serial No. 210,818

4 Claims. (Cl. 310—76)

This invention relates to electric power transmitters, or clutch-brake driving devices, for looms and similar machines which start and stop quickly in response to either manual or automatic controls.

One of the objects of this invention is to provide an improved bearing structure at the end of the frame carrying the gear or driving element which connects the driving device to the machine, and to provide an improved bearing structure at the other end of the shaft, which latter bearing structure is slidable in the frame of the machine for the purpose of moving the driven shaft of the transmitter endwise to cause the driven element of the clutch to engage either the brake or driving clutch element.

Other objects and features of the invention will become apparent from a consideration of the following description and the appended claims taken in connection with the accompanying drawings, in which:

Figure 1:
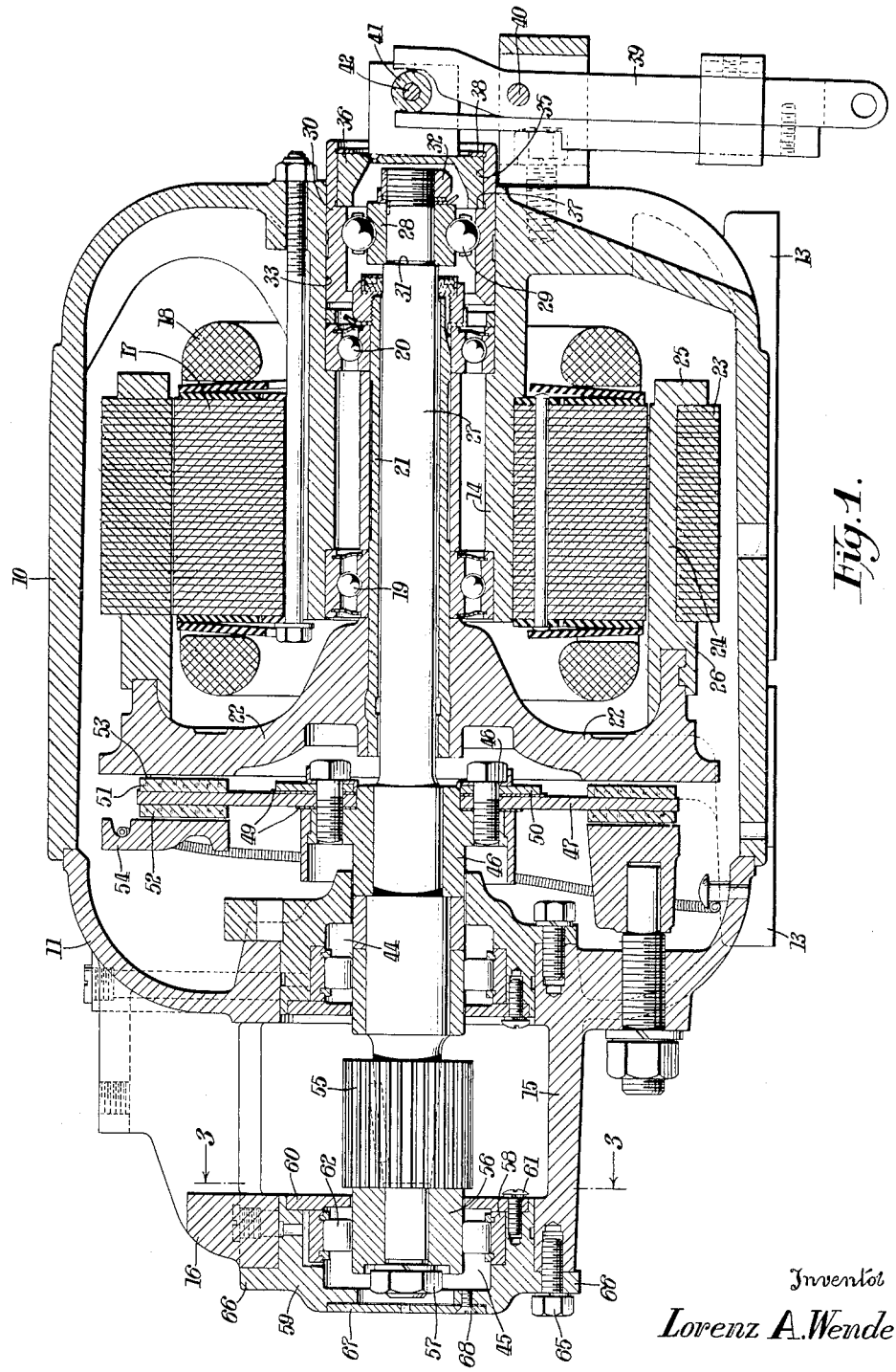
Fig. 1 is a longitudinal sectional view taken substantially through the center of an electric motor-clutch drive embodying my invention.
Figure 2:
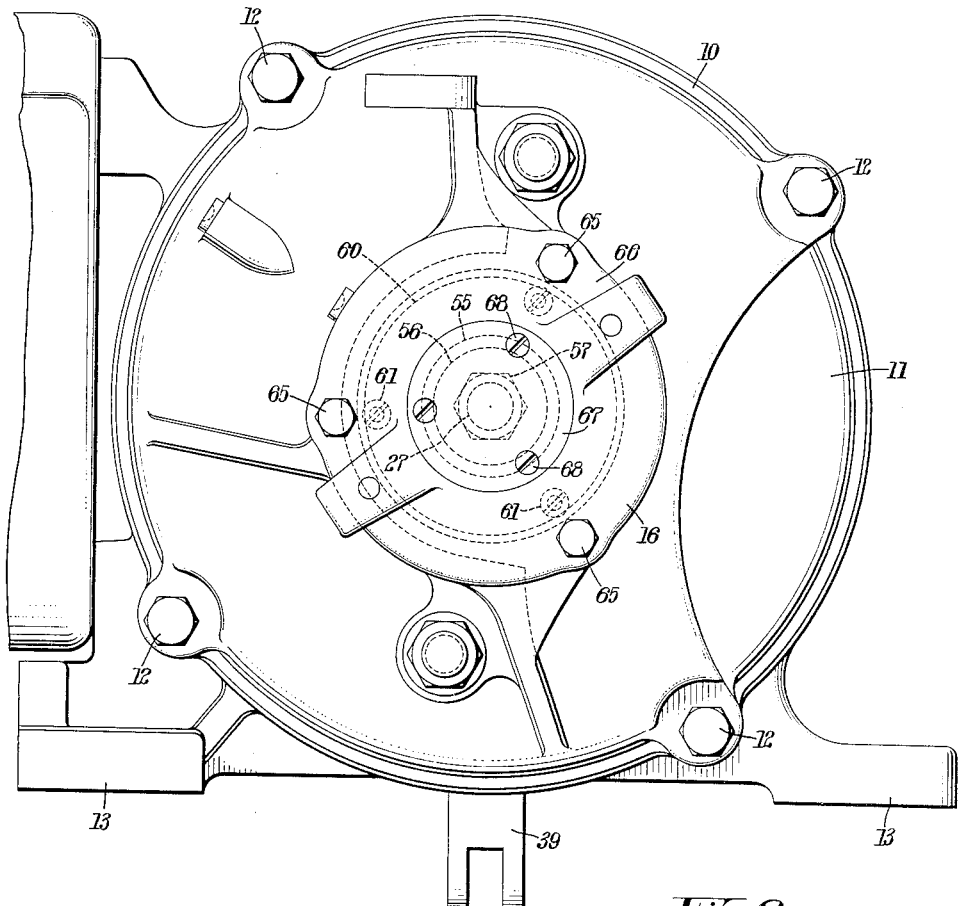
Fig. 2 is a left end elevation of the transmitter shown in Fig. 1.
Figure 3:
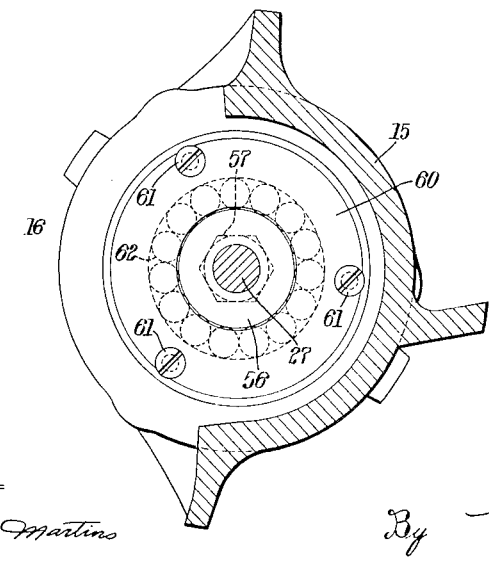
Fig. 3 is a vertical sectional view taken substantially along the line 3—3 of Fig. 1.

In the embodiment of the invention selected for illustration, the clutch-brake drive is formed with a hollow cylindrical cast-iron frame comprising the parts 10 and 11 which are held together by the screws 12. The part 10 is formed with attaching feet 13 and an inwardly extending centrally located tubular portion 14. The part 11 is formed with a laterally extending portion 15 having a U-shaped cross-section as shown in Fig. 3, and an upstanding bearing supporting portion 16. Secured to the outer periphery of the tubular portion 14 is a stationary electromagnetic element or stator of an electric motor, comprising a stack of toothed laminations 17 and winding 18 of any desired type.

Carried internally by the tubular portion 14 are spaced ball-bearings 19 and 20 in which is journaled a tubular motor shaft 21 having a cast-iron spider 22 secured to its free end. The rotary magnetic element of the motor comprises a stack of laminations 23 having conductor bars 24 and end rings 25 and 26 die cast integrally with each other and to the spider 22. The cast-iron spider and external rotor of the motor form a driving element having a fly-wheel effect. The above described motor is disclosed in the Turner et al. Patent No. 2,510,917 dated June 6, 1950, to which reference may be had for a more detailed disclosure.

Extending through the tubular motor shaft 21 is a driven shaft 27 having one of its ends journaled in a deep-grooved ball-bearing comprising an inner race-member 28 secured to the end of the shaft 27, antifriction balls 29 and an outer-race member 30. The inner-race is held against lateral displacement on the shaft 27 by a shoulder 31 formed on the shaft and a nut 32 threaded on the end of the shaft. The outer-race 30 slides longitudinally in a bore 33 formed in the frame member 10 and is approximately three times as long as the inner-race 28, thereby to afford an enlarged outer peripheral surface which serves as a sliding bearing surface. The outwardly extending portion of the outer-race 30 is formed with an enlarged internal bore 35 which receives a clevis 36 abutting the shoulder 37 formed in the race and is held in position by a split spring-ring 38 which enters a suitable internal groove in the outer-race 30. The shaft 27 is moved longitudinally back and forth through this ball-bearing assembly by means of a lever 39 pivoted at 40 to the frame of the transmitter and having one of its ends bifurcated to receive a roller 41 carried by a pin 42 fixed to the clevis 36. The means for actuating the clevis is more fully disclosed in the Turner et al. patent referred to above, to which reference may be had for a more detailed disclosure.

The other end of the driven shaft 27 is journaled for rotary and endwise movement in a bearing 44 and an outboard bearing assembly indicated generally as 45 carried, respectively, by the casing part 11 and the bearing supporting portion 16. Secured to the driven shaft 27 at a point adjacent the bearing 44 is a hub 46 having a driven element or disk 47 secured thereto by means of the screws 48 and thin washers of emery paper 49 which engage the disk on opposite sides thereof and are forced against opposite faces of the disk due to the clamping action between the metal washer 50 and the hub 46. In this connection, it will be understood that the disk washers 49 are formed of fabric or paper with particles of fine emery uniformly distributed on both sides of the washer. When the screws 48 are tightened, these washers are clamped between the metal washer 50 and the hub 46 and as more and more pressure is applied by further tightening of the screws 48 the particles of emery dig into the adjacent metal and thus form myriads of small keys which securely and effectively prevent turning movement between the driven element 47 and its hub 46. Secured to opposite sides and near the outer peripheral portion of the driven element 47 are the friction rings 51 and 52. The friction ring 51 is adapted to engage the driving clutch face 53 of the spider 22 and the ring 52 is adapted to engage the brake ring 54 adjustably secured upon the part 11 of the frame.

A driving pinion 55 is secured to the driven shaft 27 between the bearings 44 and 45, and in order that the pinion may be quickly and easily removed or replaced, the bearing assembly 45 is of the cartridge type, which is removable as a unit, and the external diameter of the cartridge is greater than the diameter of the gear. The bearing 45 comprises an inner-race 56 carried by the end of the shaft 27 and held thereon by a nut 57; an outer-race 58 clamped between the member 59 and the plate 60 by the screws 61; and anti-friction elements 62, which in this instance are rollers. This bearing assembly is removably secured to the casing of the transmitter by the screws 65 which pass through suitable apertures in a flange 66 of the member 59 and are threaded in the bearing supporting portion 16 of the transmitter casing. To enclose the bearing, a cover-plate 67 is removably secured to the member 59 by the screws 68.

From the above description, it will be understood that the driving pinion 55 is supported in bearings located adjacent the pinion and on opposite sides thereof and that the outboard bearing may be readily removed to permit removal of the pinion from the driven shaft. This construction reduces gear breakage, prevents uneven wear of the gear and stiffens the shaft to prevent flagging during sudden starts and stops. It will be further understood that the construction of the ball-bearing in which the other end of the driven shaft is journaled permits the use of the maximum size deep groove ball-bearing.

While in accordance with the provisions of the statutes I have illustrated one form of my invention it will be apparent to those skilled in the art that changes may be made in the form of the apparatus without departing from the spirit of the invention as set forth in the appended claims.

Having thus set forth the nature of the invention, what I claim herein is:

1. A unitary electric clutch-brake driving device comprising, a hollow frame formed in two parts, one of said parts having an inwardly extending centrally located tubular bearing portion and the other of said parts having spaced bearing portions, a driving clutch element and a brake located in said frame, a driven clutch element located between said driving clutch element and said brake, a driven shaft carrying said driven element and having one of its ends journaled in the tubular bearing portion of the frame and its other end journaled in bearings carried by the spaced bearing portions in the other part of the frame, and a driving pinion fixed to said driven shaft and disposed between said spaced bearing portions.

2. A unitary electric clutch-brake driving device comprising, a hollow frame having a driving clutch element and a brake disposed therein, a bearing located in one end of said frame, a pair of spaced bearing supports located in the other end of said frame, removable bearings carried by said supports at least one of which is of the cartridge type, a driven element located within said frame and arranged to engage with said clutch driving element or said brake, a driven shaft carrying said driven element and journaled in each of said bearings, and a driving gear disposed between said bearing supports and fixed to said shaft, said gear having an external diameter which is less than the external diameter of the removable cartridge bearing.

3. A unitary electric clutch-brake driving device comprising a frame formed in two parts and adapted to be secured together to form an enclosure; an internal tubular bearing and electric motor stator support formed on one part of said frame; the other part of said frame being formed with a centrally arranged bearing support, a laterally extending portion and an outboard bearing support spaced from the first bearing support; clutch driving and brake mechanism located entirely within said frame; a driven clutch-element within said frame; a laterally movable bearing carried by the tubular bearing support; means for moving said laterally movable bearing; removable bearings carried by the other bearing supports, the bearing carried by said outboard bearing support being of the cartridge type and removable as a unit; a driven shaft to which said driven clutch-element is fixed, said shaft being journaled in all of said bearings and fixed against axial movement relative to said laterally movable bearing, and a gear fixed to said driven shaft and having an external diameter which is less than the external diameter of the cartridge type bearing.

4. A unitary electric clutch-brake driving device comprising, a substantially cylindrically shaped hollow frame; an electric motor and spaced driving clutch and brake elements located within said frame; a shiftable driven clutch element located within said frame and disposed between the clutch driving and brake elements; a driven shaft to which said driven clutch element is secured; a bearing carried in each end of said frame and in which said shaft is journaled; one of said bearings having an inner race fixed to one end of said driven shaft, an outer race substantially wider than the inner race provided with a counterbored outboard portion and slidably engaging the wall of a bore formed in the frame, and anti-frictional elements disposed between said races; a clevis extending into the outboard portion of said outer race, the diameter of said counterbore being greater than the maximum diametrical dimension of said clevis, a spring ring for securing said clevis to said outer race, and means connected to said clevis for moving said bearing and driven shaft endwise relative to the frame.

References Cited in the file of this patent
UNITED STATES PATENTS

| 1,652,704 | Daly | Dec. 13, 1927 |
| 1,717,577 | Mitchell | June 18, 1929 |
| 2,008,873 | Nydegger | July 23, 1935 |
| 2,250,981 | Abel | July 29, 1941 |
| 2,481,997 | Haigh | Sept. 13, 1949 |
| 2,510,917 | Turner | June 6, 1950 |